Patented Jan. 28, 1930

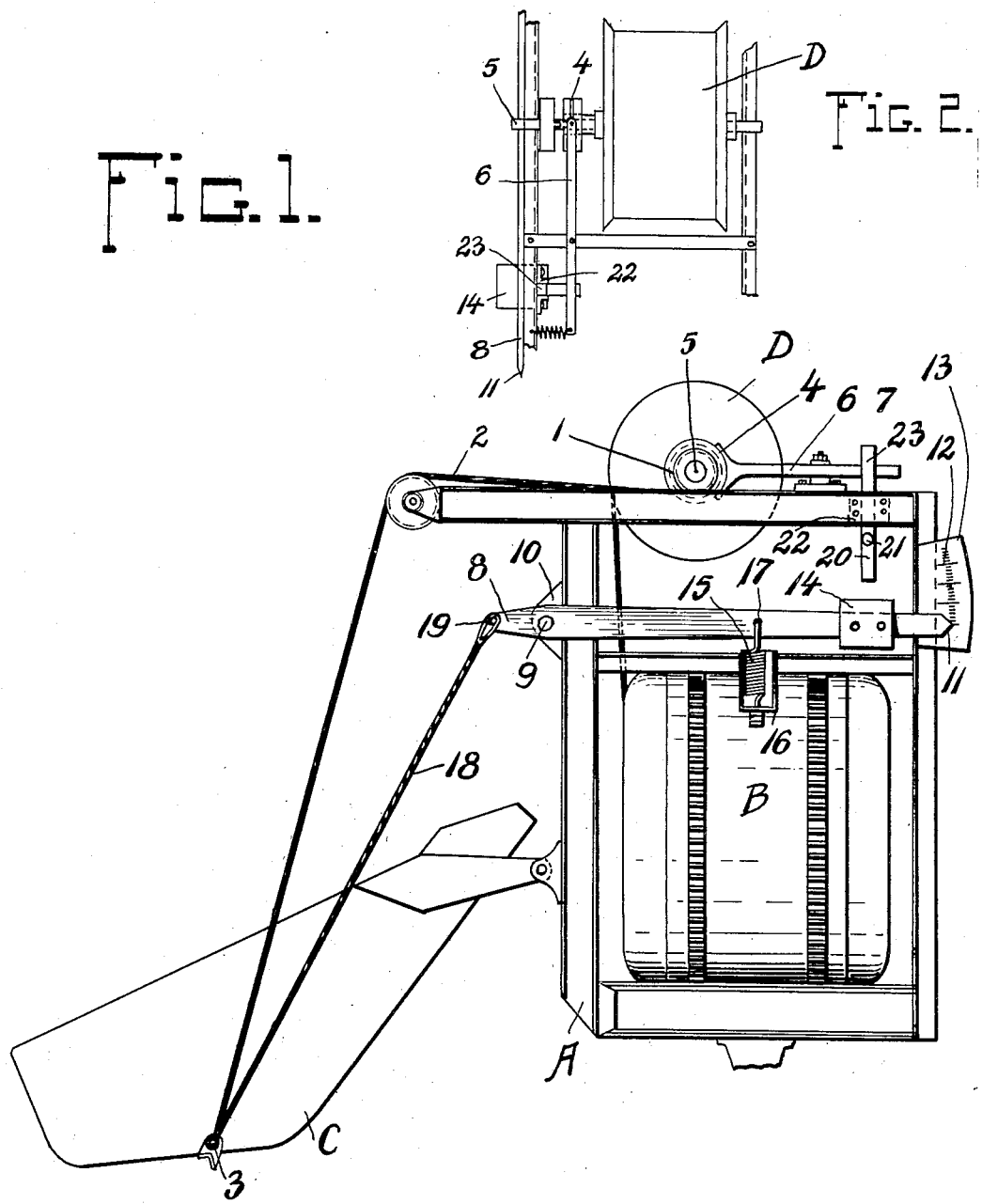

1,745,174

UNITED STATES PATENT OFFICE

ERICH H. LICHTENBERG, OF MILWAUKEE, WISCONSIN, ASSIGNOR TO KOEHRING COMPANY, OF MILWAUKEE, WISCONSIN, A CORPORATION

AGGREGATE WEIGHING AND MIXING MACHINE

Original application filed May 16, 1924, Serial No. 713,849. Divided and this application filed December 3, 1928. Serial No. 323,441.

This application is a division of my copending application filed May 16th, 1924, Serial No. 713,849 for "aggregate weighing and mixing machine" and is directed particularly to the form of aggregate weighing and mixing machine wherein the charging means or loading skip is of the pivoted type.

An object in view is the provision of means which are designed to be associated with a mixing machine of the type above noted which will function to accurately weigh materials as they are placed in the charging skip. In attaining this end, I avail of suspension instrumentalities which constitute a part of the weighing means and which function to maintain the skip upraised a slight distance from the ground so that as aggregate materials are placed in the skip compartment, the skip is forced down toward the ground against the action of the weighing instrumentalities, causing the latter to register the weight of the materials.

It is obvious that such a weighing mechanism is capable of accurately proportioning the different aggregates inasmuch as one material may be placed in the skip to a certain desired weight, after which the second material may be added, the weight desired of course being added onto the weight of the first supplied aggregate. In this manner all the materials going into a batch of concrete may be accurately weighed. In carrying out my idea more in detail, I propose to avail of a scale beam type of weighing mechanism inasmuch as such a construction is of a more or less simple nature and readily adapts itself to incorporation into the construction of this type of mixing machine. It is a further object of this invention to associate with the weighing mechanism, control instrumentalities for the hoisting means of the charging skip which function to move the latter into a position wherein the materials are charged into the mixing drum. These control instrumentalities are designed to cause operation of the skip hoisting means when the weight of the material in the skip has reached a certain predetermined point. This feature has the advantage of obviating the necessity of manual initiation of upward movement of the skip which, in accordance with this invention, may be rendered automatic.

In connection with this last mentioned feature, I propose to avail of clutch knock-out means for the skip hoisting mechanism in conjunction with the means for automatically causing upward movement thereof so that when the skip reaches a charging position, the hoisting means will be automatically brought out of operation and the skip maintained in its charging position.

With these and other objects in view as will in part become apparent and in part be hereinafter stated, the invention comprises novel combinations, constructions and arrangements of parts as will be subsequently specified and claimed.

For a full and more complete understanding of the invention, reference may be had to the following description and accompanying drawings, in which—

Figure 1 is a view in side elevation, somewhat diagrammatic, of a mixing machine made in accordance with this invention, my novel weighing apparatus being applied thereto.

Figure 2 is a plan view somewhat diagrammatic, showing the manner of application of the skip hoist means by the control instrumentalities which are affected by the weighing mechanism.

While a preferred specific embodiment of the invention is herein set forth, it is to be understood that I am not to be limited to the exact constructions illustrated and described, because various modifications of these details may be provided in putting the invention into practice within the purview of the appended claims.

In the drawings the framework of a well known type of mixing machine is referred to by the reference character A. Suitably mounted on the framework A is a mixing drum B which is charged with materials from a charging skip C. Means (not shown) are provided for discharging mixed materials from the drum. Skip hoist mechanism for the charging skip C is located on the top of the mixer and designated generally D. This mechanism includes a small winding drum 1 on which are taken up the skip hoist cables 2 which have their ends anchored to the skip as shown at 3. A clutch mechanism is located at 4 and is operable to clutch the drums 1 to shaft 5 to cause hoisting action of the skip. This clutch mechanism includes an arm 6 pivotally mounted on the framework A as shown at 7.

A scale beam 8 is pivoted at 9 to a bracket 10 which is affixed to the frame A and has one end terminating in a pointer 11 which is designed to cooperate with indicia 12 described on a plate 13 that is suitably fastened to the frame 1. The beam 8 may carry a weight member 14 which also functions as an abutment member in a manner to be hereinafter more fully set out.

A spring 15 has one end anchored to a bracket 16 included in the construction of the mixer, while its other end is made fast to the scale beam at 17. This spring functions to resist upward movement with that part of the scale beam 8 to which it is attached.

A cable 18 has each end affixed to one of the scale beams 8 at 19, while the bent portion of the cable passes beneath the skip C. It might be well to mention that both the cables 18 and the cables 2 may consist of a similar cable which is passed underneath the skip in a well known manner.

An arm 20 has an abutment member 21 thereon which is adjustable on the said arm 20. This abutment member is adapted to be engaged by the member 14 to cause upward movement of the arm 20. The latter is slidably mounted in a bracket 22 which is affixed to the frame A and has at its upper end a tapered head portion 23, the inclined surface of which is in engagement with the arm 6 so that upward movement of this member causes a swinging of the arm 6 to operate the clutch mechanism.

In the operation of a mixing machine with my invention applied thereto, some aggregate, say sand, is first placed in the skip C until the pointer 11, in conjunction with indicia 12, indicates that the desired weight of the material has been supplied, after which the gravel or cement are added in a similar manner, the pointer 11 indicating the total weight of the materials in the skip. Now as to the phase of automatic operation of the skip, it will be noted that the abutment member 21 may be adjusted so that the member 14 will engage thereagainst when a certain predetermined weight of materials is in the skip. When this engagement takes place, the arm 20 is moved upwardly causing an upward movement of the tapered portion 23 to swing the clutch arm 6, whereby the skip hoist clutch is engaged to cause upward movement of the skip to a charging position. Conventional clutch knock-out means, not shown, may be provided to knock out the clutch when the skip has reached its charging position, this being a well known expedient in the art. It is obvious that the cables 18 may be made of proper length so as to maintain the skip C upraised a slight distance from the ground or like surface.

Having thus described my invention, what I claim as new and desire to secure by Letters Patent of the United States, is:

1. In a concrete mixing machine of the class described, the combination, with a pivotally mounted charging skip movable from a non-charging into a charging position, devices for raising and lowering the skip, of weighing mechanism for determining the weight of the materials in the skip and connected therewith, said mechanism including indicia means for designating the weight of materials in the skip.

2. In a concrete mixing machine of the class described, the combination, with a pivotally mounted charging skip and means for hoisting the skip into a charging position, of weighing mechanism for determining the weight of materials in the skip, said mechanism including suspension means for maintaining the skip upraised a slight distance off the ground or like surface.

3. In a concrete mixing machine of the class described, the combination, with a pivotally mounted charging skip and means for hoisting the skip into a charging position, of weighing mechanism for determining the weight of materials in the skip, said weighing mechanism including a scale beam pivotally mounted on the framework of the mixing machine, suspension means connecting one end of the scale beam with the skip, and means associated with the scale beam adjacent the other end for resisting movement thereof caused by gravity action due to the weight of materials in the skip.

4. A concrete mixing machine of the class described, comprising, in combination, a mixing drum, charging means therefor, means for hoisting the charging means into position wherein its contents are charged into the mixing drum, and mechanism for automatically initiating operation of said last mentioned means when a predetermined weight of materials has been placed in the charging means.

5. A concrete mixing machine of the class described, comprising, in combination, a frame, a charging skip pivotally mounted on said frame, weighing mechanism associated with the frame and charging skip and operable to determine the weight of materials in the skip, means for moving the charging skip into a position wherein its contents are discharged out of the skip, and control instrumentalities adapted to be affected by the weighing mechanism when a predetermined weight of materials has been deposited in the charging skip to effect initiation of operation of the skip moving means whereby the latter automatically moves the skip into a discharging position.

6. A concrete mixing machine of the class described, comprising, in combination, a framework, a mixing drum mounted on the framework, a skip pivotally mounted on the framework movable into a position wherein its contents are charged into the drum, and means for automatically initiating movement of the skip into a charging position when a predetermined weight of materials has been deposited in the said skip.

7. Weighing mechanism for concrete mixing machines of the class described, comprising, in combination, a loading skip, a scale beam, means for suspending the loading skip from one end of the scale beam, the other end of the scale beam constituting a pointer, indicia means adapted to cooperate with the pointer end of the scale beam, and means for causing resistance to movement on the part of the pointer end of the scale beam due to weight of materials in the skip.

8. A concrete mixing machine of the class described, comprising, in combination, a loading skip movable into position wherein it deposits its contents, weighing mechanism including an abutment member, means for moving the skip into a discharging position, instrumentalities for controlling the operation of said last named means comprising clutch mechanism, a clutch arm, a member adapted to affect the clutch arm to cause operation of the clutch mechanism whereby movement of the skip into a discharging position is initiated, and an abutment member adapted to be engaged by the abutment member of the weighing mechanism when a predetermined weight of materials has been deposited in the skip.

9. A concrete mixing machine of the class described, comprising, in combination, a framework, a loading skip pivotally mounted on the framework, hoisting means for the loading skip including a cable, a hoisting drum on which the cable is wound, a drive shaft, means for clutching the drum to the drive shaft, and means for automatically causing the operation of said last named means to clutch the drum to the shaft to cause hoisting action of the skip when a predetermined weight of materials has been deposited in the said skip.

10. In a concrete mixing machine of the class described, the combination, with a charging skip that is adapted to receive materials and be upraised to a position wherein the materials are charged into a mixing machine, of weighing mechanism for determining the weight of materials in the skip connected with the skip.

11. In a concrete mixing machine of the class described, the combination, with a charging skip adapted to assume a position on the ground wherein it receives materials and also for movement upwardly into a position wherein its aggregates are charged into the drum of a mixing machine, of weighing mechanism for determining the weight of the materials in the skip, said mechanism including indicia means for designating the weight of the materials in the skip, and means connecting the weighing mechanism with the skip to accomplish said weighing action.

12. In a concrete mixing machine of the class described, the combination, with a charging skip adapted to assume a position on the ground wherein it receives materials and also for movement upwardly into a position wherein its aggregates are charged into the drum of a mixing machine, of weighing mechanism for determining the weight of the materials in the skip, said mechanism including suspension means for maintaining the skip upraised a slight distance off the ground or similar surface.

In testimony whereof I affix my signature.

ERICH H. LICHTENBERG.